(No Model.)
J. W. CLARK.
CULTIVATOR.
No. 366,927. Patented July 19, 1887.
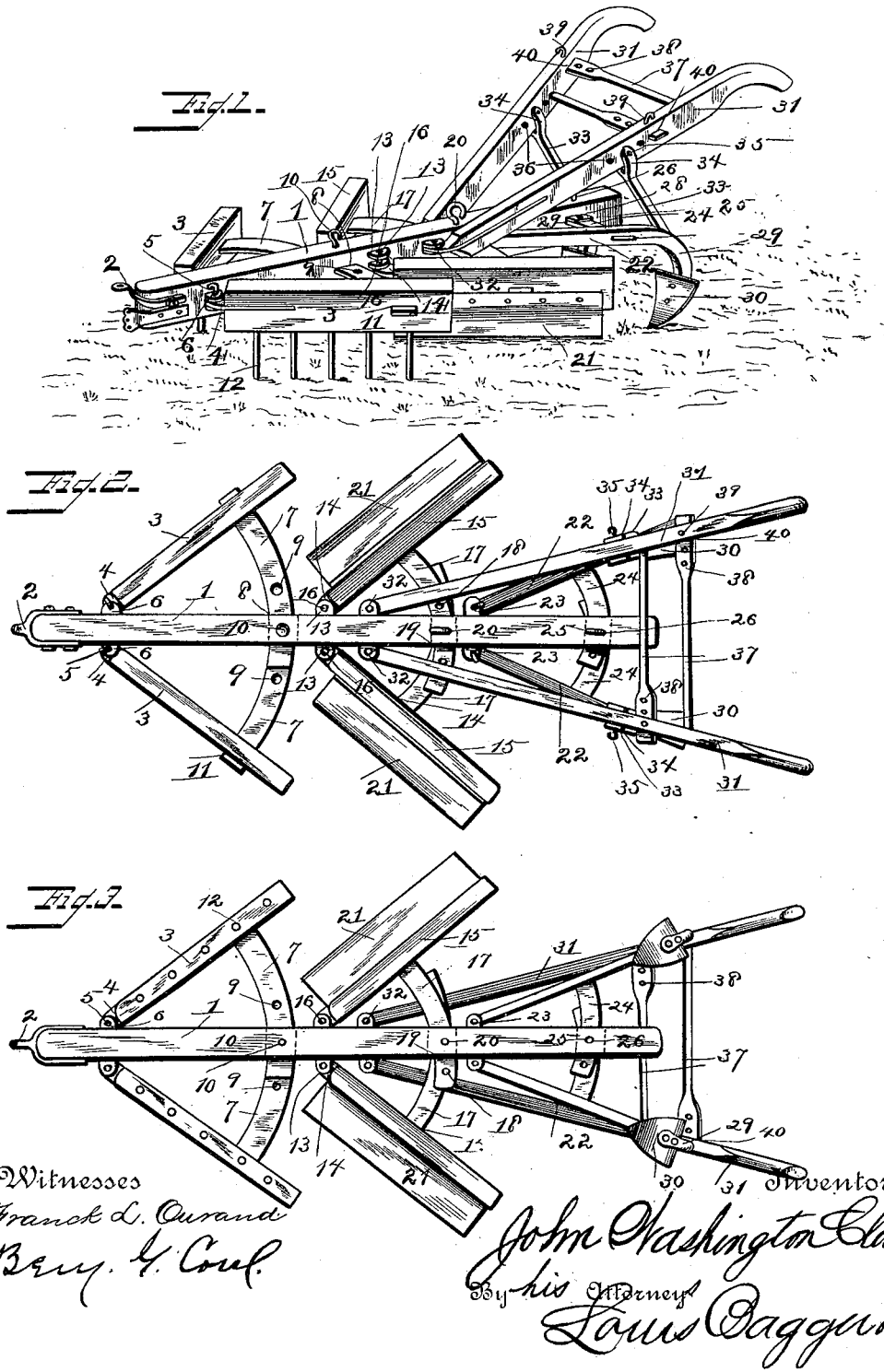

United States Patent Office.

JOHN WASHINGTON CLARK, OF JONES' VALLEY, TENNESSEE.

CULTIVATOR.

SPECIFICATION forming part of Letters Patent No. 366,927, dated July 19, 1887.

Application filed May 28, 1887. Serial No. 239,683. (No model.)

*To all whom it may concern:*

Be it known that I, JOHN WASHINGTON CLARK, a citizen of the United States, and a resident of Jones' Valley, in the county of Hickman and State of Tennessee, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cultivator. Fig. 2 is a top plan view of the same, and Fig. 3 is a bottom view.

Similar numerals of reference indicate corresponding parts in all the figures.

My invention has relation to that class of cultivators in which the beams bearing the cultivating devices are pivoted at their ends to a central beam and provided with means for adjusting them at different angles to the said beam, causing them to occupy a wider or narrower row, as desired; and it consists in the improved construction and combination of parts of such a cultivator, as hereinafter more fully described and claimed.

In the accompanying drawings, the numeral 1 indicates the central beam, which is provided at its forward end with an upwardly and forwardly curved eyed bar, 2, or with a clevis for the attachment of the team, the curved eyed bar being preferably used for the attachment of a single team, while the clevis is used to attach a double team to. Two beams, 3, are pivoted with perforated ears 4 at their forward ends to the sides of the beam near the forward end of the same, having the perforated ears pivoted upon bolts 5, passing through two pairs of perforated ears, 6, upon the sides of the beam, and the rear portions of these beams are provided with segmental flat bars 7, which slide with their inner portions in longitudinal and horizontal slots 8 in the main beam, and have series of perforations 9, by means of which they may be adjusted upon a bolt, 10, passing through perforations 11 in the slotted portion of the beam, registering with the perforations in the segmental bars. These pivoted beams, which may be adjusted with their rear diverging ends to spread at any desired angle, have harrow-teeth 12 inserted through them, pulverizing the soil as the cultivator is drawn over it.

Two vertically-arranged sets of perforated ears, 13—three, more or less, in each set—project from the sides of the central beam to the rear of the longitudinal slot in the same, and perforated ears 14 in the forward ends of two beams, 15, are pivoted upon bolts 16, between two pairs of ears of the said sets, and have segmental flat bars 17 near their rear ends, having series of perforations 18 adjusted in a slot, 19, in the beam by means of a bolt, 20, the said beams being adjustable similar to the forward harrow-beams. These said diverging beams are provided with flat scraping or cutting blades 21 upon their under sides, projecting forward with their cutting-edges.

Two cultivator-beams, 22, are pivoted with their forward perforated ears between pairs of perforated ears 23 upon the central beam near the rear end of the same, and have perforated segmental flat bars 24, sliding in a slot, 25, in the beam, and adjusted by the bolt 26, passing through perforations 27 and 28, respectively, in the beam and in the segmental bars, and the rear downwardly-curved ends of these beams form the standards 29, to which shovels 30 are secured in the usual manner.

Handles 31 are pivoted with their forward ends between perforated ears 32 upon the sides of the beam to the rear of the forward ends of the scraper-beams, and the rear ends of these handles are braced by means of pivoted braces 33, having bifurcated, perforated, or eyed ends 34 straddling the handles, and adjusted by means of transverse bolts 35 in series of perforations 36 in the handles.

Bars 37 project inwardly from the rear ends of the handles, and their free ends are formed with series of perforations 38, by means of which they are secured upon bolts 39 in slots 40 in the handles, the said bars serving to adjust the handles at different widths.

It will thus be seen that the harrow-beams, the scrapers, and the cultivators may all be adjusted to stand at different angles, and thus to fill rows of different widths, and, if desired, the several beams may be exchanged, placing either the scrapers or the cultivators in the forward position, the beams being placed in the consecutive order which the treatment of the soil will demand. One or two pairs of the beams may also be removed, if desired, and the various changes and adjustments which the construction of the implement admits of may be performed to suit the class of work demanded by the soil.

Having thus described my invention, I claim and desire to secure by Letters Patent of the United States—

In a cultivator, the combination of a central beam having sets of perforated ears upon its sides and having longitudinal horizontal slots to the rear of the ears, harrow-beams pivoted to the forward end of said beam having adjusting segmental bars, a pair of scraper-beams pivoted centrally to the beam and adjusted at a suitable angle by perforated segmental bars, a pair of cultivator-beams pivoted to the beam to the rear of said scrapers, and having also segmental adjusting-bars, a pair of handles having laterally-projecting bars sliding with their perforated ends in slots in the opposite handle, and braces pivoted to the cultivator-beams and adjustable on the handles, as and for the purpose shown and set forth.

In testimony that I claim the foregoing as my own I have hereunto affixed my signature in presence of two witnesses.

JOHN WASHINGTON CLARK.

Witnesses:
W. J. McEWEN,
S. D. SEELY.